(12) United States Patent
Yamaguchi

(10) Patent No.: US 10,690,134 B2
(45) Date of Patent: Jun. 23, 2020

(54) DRIVE DEVICE

(71) Applicant: Nidec Corporation, Kyoto (JP)

(72) Inventor: Yasuo Yamaguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 14 days.

(21) Appl. No.: 16/323,640

(22) PCT Filed: Aug. 8, 2017

(86) PCT No.: PCT/JP2017/028692
§ 371 (c)(1),
(2) Date: Feb. 6, 2019

(87) PCT Pub. No.: WO2018/030374
PCT Pub. Date: Feb. 15, 2018

(65) Prior Publication Data
US 2019/0207480 A1    Jul. 4, 2019

Related U.S. Application Data

(60) Provisional application No. 62/439,201, filed on Dec. 27, 2016, provisional application No. 62/402,027, (Continued)

(30) Foreign Application Priority Data

Mar. 31, 2017   (JP) ................................. 2017-071397

(51) Int. Cl.
*F04C 2/10* (2006.01)
*H02K 9/19* (2006.01)
(Continued)

(52) U.S. Cl.
CPC ................ *F04C 2/10* (2013.01); *F04C 2/102* (2013.01); *F04C 2/103* (2013.01); *F04C 13/002* (2013.01);
(Continued)

(58) Field of Classification Search
CPC ........... H02K 9/19; H02K 11/048; H02K 7/10
(Continued)

(56) References Cited

U.S. PATENT DOCUMENTS 6,039,551 A    3/2000  Takeuchi et al.
6,116,877 A    9/2000  Takeuchi et al.
(Continued)

FOREIGN PATENT DOCUMENTS

CN    102472271 A    5/2012
CN    105114302 A    12/2015
(Continued)

OTHER PUBLICATIONS

Yamaguchi et al., "Drive Device", U.S. Appl. No. 16/323,643, filed Feb. 6, 2019.
(Continued)

*Primary Examiner* — Jose A Gonzalez Quinones
(74) *Attorney, Agent, or Firm* — Keating & Bennett

(57) ABSTRACT

A drive device includes a rotor, a stator, a housing including an accommodation portion to store oil and accommodate the rotor and the stator, a pump driven through a motor shaft, and a valve in the housing. The pump includes a pump room in the housing, a suction port through which the oil is to be sucked into the pump room, and a discharge port through which the oil is to be discharged from the pump room. The housing includes a first oil passage connected to the discharge port and a branch oil passage that is connected to the first oil passage and is open to an inside of the accommodation portion on an upper side in a vertical direction of the stator. The motor shaft includes a second oil passage located in the motor shaft and connected to the first oil passage and a first through-hole connecting the second oil passage and an outer circumferential surface of the motor shaft. The valve is provided in the branch oil passage, and switched between
(Continued)

a closed state in which a flow of the oil in the branch oil passage is blocked and an open state in which the flow of the oil in the branch oil passage is permitted.

7 Claims, 5 Drawing Sheets

Related U.S. Application Data filed on Sep. 30, 2016, provisional application No. 62/372,411, filed on Aug. 9, 2016.

(51) Int. Cl.

| | | |
|---|---|---|
| *H02K 11/225* | (2016.01) | |
| *H02K 7/14* | (2006.01) | |
| *F04C 13/00* | (2006.01) | |
| *F04C 15/06* | (2006.01) | |
| *H02K 5/20* | (2006.01) | |
| *F04C 15/00* | (2006.01) | |
| *H02K 7/00* | (2006.01) | |
| *F16K 17/04* | (2006.01) | |
| *F16N 1/00* | (2006.01) | |
| *F16N 7/40* | (2006.01) | |
| *F16N 13/20* | (2006.01) | |
| *H02K 9/193* | (2006.01) | |
| *H02K 1/12* | (2006.01) | |
| *H02K 1/22* | (2006.01) | |

(52) U.S. Cl.
CPC ........ *F04C 13/005* (2013.01); *F04C 15/0088* (2013.01); *F04C 15/0096* (2013.01); *F04C 15/06* (2013.01); *F16K 17/04* (2013.01); *F16K 17/0406* (2013.01); *F16N 1/00* (2013.01); *F16N 7/40* (2013.01); *F16N 13/20* (2013.01); *H02K 5/20* (2013.01); *H02K 7/003* (2013.01); *H02K 7/14* (2013.01); *H02K 9/19* (2013.01); *H02K 9/193* (2013.01); *H02K 11/225* (2016.01); *F04C 2210/14* (2013.01); *F04C 2280/02* (2013.01); *F16N 2210/18* (2013.01); *F16N 2280/00* (2013.01); *H02K 1/12* (2013.01); *H02K 1/22* (2013.01)

(58) Field of Classification Search
USPC ..................................... 310/54, 57, 75 R, 98
See application file for complete search history.

(56) References Cited

U.S. PATENT DOCUMENTS

| | | | |
|---|---|---|---|
| 6,227,828 | B1 | 5/2001 | Takeuchi et al. |
| 7,211,913 | B2 | 5/2007 | Tsutsui et al. |
| 7,828,095 | B2 | 11/2010 | Murata et al. |
| 9,441,628 | B2 | 9/2016 | Sakata et al. |
| 9,762,106 | B2 | 9/2017 | Gauthier et al. |
| 2004/0200350 | A1 | 10/2004 | Makino et al. |
| 2007/0178292 | A1 | 8/2007 | Hasegawa et al. |
| 2012/0128513 | A1 | 5/2012 | Sakata et al. |
| 2012/0220379 | A1* | 8/2012 | Murakami ............... H02K 1/32 464/7 |
| 2013/0145879 | A1 | 6/2013 | Nakamura et al. |
| 2014/0077631 | A1* | 3/2014 | Watanabe ................ H02K 9/19 310/54 |
| 2015/0180313 | A1* | 6/2015 | Hayashi ................... H02K 1/32 310/54 |
| 2016/0153546 | A1 | 6/2016 | Ogawa et al. |
| 2016/0248303 | A1* | 8/2016 | Kiyokami ............ H02K 1/2706 |
| 2017/0133912 | A1* | 5/2017 | Gi ......................... H02K 7/003 |
| 2017/0227006 | A1 | 8/2017 | Lewis et al. |

FOREIGN PATENT DOCUMENTS

| | | |
|---|---|---|
| JP | 62-29487 U | 2/1987 |
| JP | 2010-004603 A | 1/2010 |
| JP | 2010-252521 A | 11/2010 |
| JP | 2011-004487 A | 1/2011 |
| JP | 2013-055728 A | 3/2013 |
| JP | 2016-101042 A | 5/2016 |
| JP | 2016-181954 A | 10/2016 |
| JP | 2017-063542 A | 3/2017 |
| WO | 2016/033015 A1 | 3/2016 |

OTHER PUBLICATIONS

Migita et al., "Drive Device", U.S. Appl. No. 16/323,632, filed Feb. 6, 2019.
Yamaguchi et al., "Drive Apparatus", U.S. Appl. No. 16/323,633, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,641, filed Feb. 6, 2019.
Official Communication issued in International Patent Application No. PCT/JP2017/028692, dated Dec. 5, 2017.

\* cited by examiner

US 10,690,134 B2

DRIVE DEVICE

BACKGROUND OF THE INVENTION

1. Field of the Invention

The present disclosure relates to a drive device.

2. Description of the Related Art

There is known a rotary electric machine including a case in which a lubricating fluid for lubrication and cooling of a stator, a rotor, and the like is stored.

In some cases, a pump that sucks up oil stored in the case is provided in the rotary electric machine. The oil is sucked up by the pump to supply the oil to the rotor and the stator, which allows the rotor and the stator to be cooled. In this case, for example, the pump is driven using rotation of the rotary electric machine. However, in the case that the rotary electric machine rotates at a high speed, oil pressure in the pump increases, and the pump may be damaged.

SUMMARY OF THE INVENTION

According to an example of the present disclosure, a drive device includes a rotor including a motor shaft disposed along a center axis extending in one direction; a stator radially opposed to the rotor with a gap interposed therebetween; a housing including an accommodation portion to store oil and accommodate the rotor and the stator; a pump driven through a motor shaft; and a valve provided in the housing. The pump includes a pump room provided in the housing; a suction port through which the oil is to be sucked into the pump room; and a discharge port through which the oil is to be discharged from the pump room, the housing includes a first oil passage connected to the discharge port; and a branch oil passage that is connected to the first oil passage and is open to an inside of the accommodation portion on an upper side in a vertical direction of the stator, the motor shaft includes a second oil passage located in the motor shaft and connected to the first oil passage; and a first through-hole connecting the second oil passage and an outer circumferential surface of the motor shaft, and the valve is provided in the branch oil passage and switched between a closed state in which a flow of the oil in the branch oil passage is blocked and an open state in which the flow of the oil in the branch oil passage is permitted.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A Z-axis direction illustrated in each drawing is a vertical direction Z in which a positive side is set to an upper side while a negative side is set to a lower side. In the embodiment, the vertical direction Z is an up-and-down direction in each drawing. In the following description, the vertically upper side is simply referred to as an "upper side", and the vertically lower side is simply referred to as a "lower side".

Figure 1:
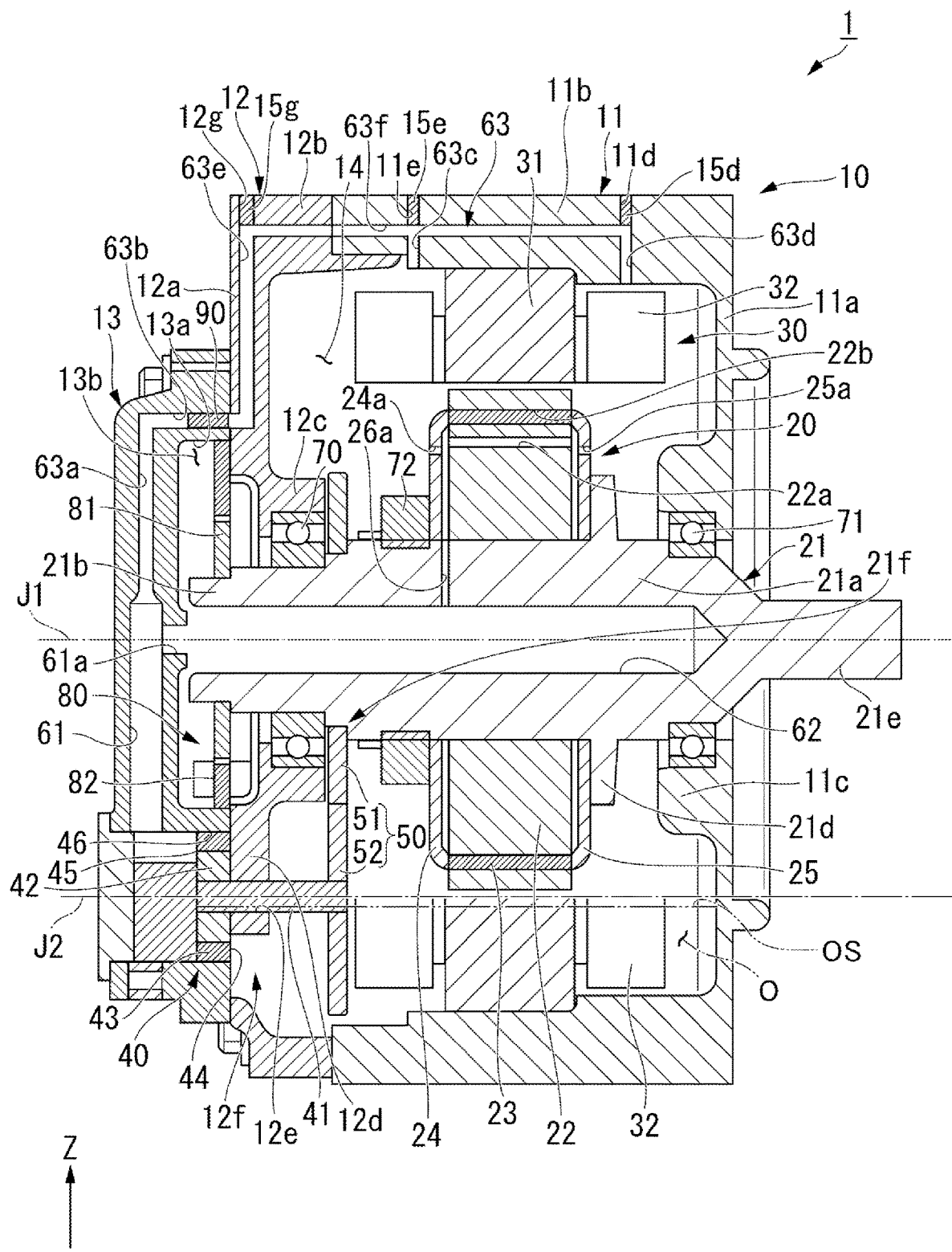
FIG. 1 is a sectional view illustrating a drive apparatus according to an example embodiment of the present disclosure.

As illustrated in FIG. 1, a drive device 1 according to a first embodiment includes a housing 10, a valve 90, a rotor 20 including a motor shaft 21 disposed along a center axis J1 extending in one direction, a rotation detector 80, a stator 30, a pump 40, a transmission member 50, and bearings 70, 71.

The center axis J1 extends in a lateral direction of FIG. 1. That is, in the embodiment, the lateral direction in FIG. 1 corresponds to one direction. In the following description, a direction parallel to the center axis J1 is simply referred to as an "axial direction", a radial direction centered on the center axis J1 is simply referred to as a "radial direction", and a circumferential direction centered on the center axis J1 is simply referred to as a "circumferential direction". In the axial direction, a left side in FIG. 1 is referred to as "one side in the axial direction", and a right side in FIG. 1 in the axial direction is referred to as "the other side in the axial direction".

The housing 10 includes a main body 11, an inner lid 12, and an outer lid 13. In the embodiment, the main body 11, the inner lid 12, and the outer lid 13 are a separate member. The main body 11 has a bottomed tubular shape that is open on one side in the axial direction. The main body 11 includes a bottom unit 11a, a main body tube 11b, and a bearing holder 11c. The bottom unit 11a has an annular plate shape expanding in the radial direction. The main body tube 11b has a cylindrical shape extending from a radially outer edge of the bottom unit 11a toward one side in the axial direction. The bearing holder 11c has a cylindrical shape protruding from an inner edge of the bottom unit 11a toward one side in the axial direction. The bearing holder 11c holds the bearing 71 inside the bearing holder 11c.

The inner lid 12 is a covered tubular shape that is open to the other side in the axial direction. The inner lid 12 is attached to one side in the axial direction of the main body 11. The inner lid 12 includes an inner lid wall 12a, a first tube 12b, and a bearing holder 12c. The inner lid wall 12a has an annular plate shape extending in the radial direction. The inner lid wall 12a covers one side in the axial direction of the stator 30. That is, the inner lid 12 covers one side in the axial direction of the stator 30. An opening 12f axially penetrating the inner lid wall 12a is provided at a lower end of the inner lid wall 12a. That is, the inner lid 12 includes the opening 12f axially penetrating the inner lid 12.

The first tube 12b has a cylindrical shape extending from a radially outer edge of the inner lid wall 12a toward the other side in the axial direction. An end on the other side in the axial direction of the first tube 12b is fixed while contacting with an end on one side in the axial direction of the main body tube 11b. The bearing holder 12c has the cylindrical shape protruding from the inner edge of the inner lid wall 12a toward the other side in the axial direction. The bearing holder 12c holds the bearing 70 inside the bearing holder 12c. That is, the inner lid 12 holds the bearing 70.

The accommodation unit 14 surrounded by the main body 11 and the inner lid 12 is formed by fixing the main body 11 and the inner lid 12 to each other. That is, the housing 10 includes the accommodation unit 14. The accommodation unit 14 can store oil O while accommodating the rotor 20 and the stator 30. The oil O is stored in a lower region in the accommodation unit 14. As used herein, "the lower region in the accommodation unit" includes a portion located below a center in the vertical direction Z in the accommodation unit.

In the embodiment, a liquid level OS of the oil O stored in the accommodation unit 14 is located above the opening 12f. The liquid level OS of the oil O fluctuates by sucking up the oil O using the pump 40, but is disposed below the rotor 20 at least when the rotor 20 rotates. Consequently, when the rotor 20 rotates, the oil O can be prevented from becoming rotational resistance of the rotor 20.

The outer lid 13 is attached to one side in the axial direction of the inner lid 12. The outer lid 13 covers one side in the axial direction of the motor shaft 21. The outer lid 13 includes a recess 13a recessed from a surface on the other side in the axial direction of the outer lid 13 toward one side in the axial direction. The recess 13a axially overlaps the bearing holder 12c. The recess 13a is closed by a surface on one side in the axial direction of the inner lid 12, namely, the surface on one side in the axial direction of the inner lid wall 12a. Consequently, a space 13b surrounded by an inside surface of the recess 13a and the surface on one side in the axial direction of the inner lid 12 is formed. The center axis J1 passes through the space 13b.

Figure 2:
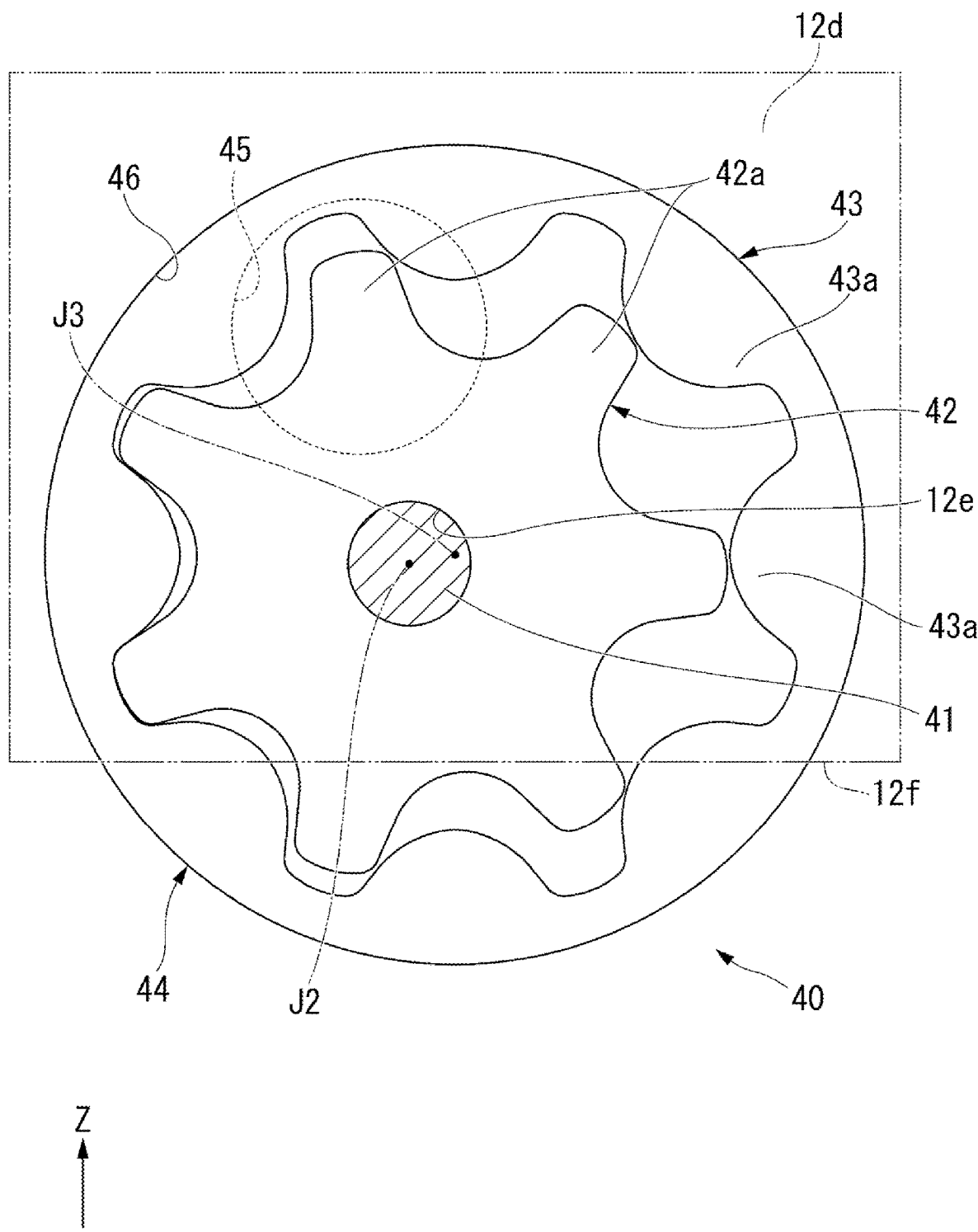
FIG. 2 is a diagram illustrating a pump portion according to an example embodiment of the present disclosure when viewed from a second axial side.

A pump room 46 is provided in the outer lid 13. That is, the pump room 46 is provided in the housing 10. The pump room 46 is recessed from the surface on the other side in the axial direction of the outer lid 13 toward one side in the axial direction. More particularly, the pump room 46 is recessed from the surface on the other side in the axial direction at a lower end of the outer lid 13 toward one side in the axial direction. As illustrated in FIG. 2, an outer shape of the pump room 46 viewed along the axial direction is a circular shape. The pump room 46 accommodates an internal gear 43 and an external gear 42 (to be described later).

As illustrated in FIG. 1, an upper portion of the opening on the other side in the axial direction of the pump room 46 is closed by an end face on the one side in the axial direction of the inner lid wall 12a. That is, the inner lid 12 includes a closing unit 12d that closes a part of the opening on the other side in the axial direction of the pump room 46. In the first embodiment, the closing unit 12d is a part of the lower portion of the inner lid wall 12a. The closing unit 12d includes a sliding bearing unit 12e axially penetrating the closing unit 12d. The sliding bearing unit 12e is located between the pump room 46 and the accommodation unit 14 in the axial direction. An end on one side in the axial direction of the sliding bearing unit 12e is open to the pump room 46. An end on the other side in the axial direction of the sliding bearing unit 12e is open to the inside of the accommodation unit 14. At least a part of the sliding bearing unit 12e is disposed below the liquid level OS of the oil O stored in the accommodation unit 14. In FIG. 1, the lower portion of the sliding bearing unit 12e is disposed below the liquid level OS. As illustrated in FIG. 2, the outer shape of the sliding bearing unit 12e viewed in the axial direction is a circular shape. In the first embodiment, the sliding bearing unit is constructed with the same member as the inner lid 12. Alternatively, the inner lid may include a sliding bearing support unit supporting the sliding bearing, and a sliding bearing member such as a sintered oil retaining bearing may be held.

The lower end of the pump room 46 axially overlaps the opening 12f. Consequently, the lower end of the pump room 46 faces the inside of the accommodation unit 14 with the opening 12f interposed therebetween. The lower end of the pump room 46 facing the inside of the accommodation unit 14 is a suction port 44. That is, the opening 12f exposes the suction port 44 to the inside of the accommodation unit 14. In the first embodiment, the pump room 46 is easily formed because the outer lid 13 is a member separate from the inner lid 12.

As illustrated in FIG. 1, the housing 10 includes a first oil passage 61 and a branch oil passage 63. In the embodiment, the first oil passage 61 is provided in the outer lid 13. The first oil passage 61 extends in the vertical direction Z. The first oil passage 61 extends from a position axially overlapping the upper end of the pump room 46 to the upper side above the center axis J1. The first oil passage 61 is disposed on one side in the axial direction of the recess 13a. The first oil passage 61 is connected to the space 13b though a connection hole 61a. For example, the connection hole 61a is a circular hole centered on the center axis J1. The lower end of the first oil passage 61 is connected to the upper end of the pump room 46 from one side in the axial direction. A portion to which the first oil passage 61 in the pump room 46 is connected is a discharge port 45. That is, the first oil passage 61 is connected to the discharge port 45.

Figure 3:
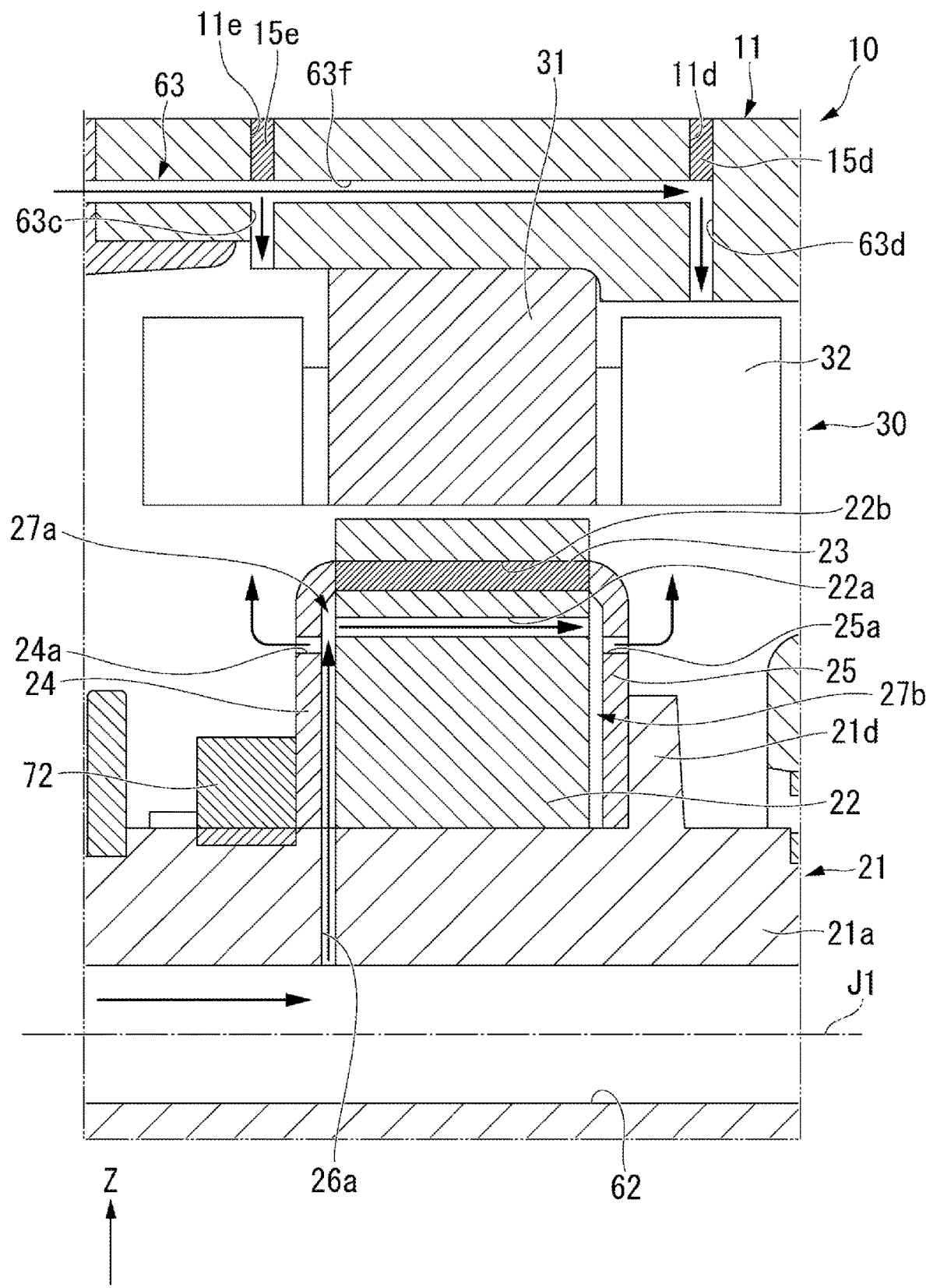
FIG. 3 is a sectional view illustrating a portion of the drive apparatus according to an example embodiment of the present disclosure.

The branch oil passage 63 is provided across the outer lid 13, the inner lid 12, and the main body 11. As illustrated in FIGS. 1 and 3, the branch oil passage 63 includes a first extension unit 63a, a second extension unit 63b, a third extension unit 63e, a fourth extension unit 63f, and supply units 63c, 63d.

As illustrated in FIG. 1, the first extension unit 63a extends in the vertical direction Z from the upper end of the first oil passage 61. Consequently, the branch oil passage 63 is connected to the first oil passage 61. The upper end of the first extension unit 63a is located at the upper end of the outer lid 13. The second extension unit 63b extends from the upper end of the first extension unit 63a toward the other side in the axial direction. An end on the other side in the axial direction of the second extension unit 63b is located in the inner lid wall 12a. The third extension unit 63e extends upward from the end on the other side in the axial direction of the second extension unit 63b. The upper end of the third extension unit 63e is located at the upper end of the inner lid wall 12a. The fourth extension unit 63f extends from the upper end of the third extension unit 63e toward the other side in the axial direction. The fourth extension unit 63f is provided to extend from the inner lid wall 12a to the first tube 12b and the main body tube 11b. The fourth extension unit 63f extends to the other side in the axial direction with respect to a stator core 31.

As illustrated in FIG. 3, the supply units 63c, 63d extend downward from the fourth extension unit 63f. The supply units 63c, 63d are provided in the main body tube 11b. The supply units 63c, 63d are open to an inner circumferential surface of the main body tube 11b. Consequently, the supply units 63c, 63d are open to the inside of the accommodation unit 14. The supply unit 63c is disposed on one side in the axial direction with respect to the stator core 31. The supply unit 63d is disposed on the other side in the axial direction with respect to the stator core 31. The supply units 63c, 63d are radially opposed to each other on the upper side of a coil 32 with a gap interposed therebetween. That is, the branch oil passage 63 is open to the inside of the accommodation unit 14 on the upper side of the stator 30. The supply unit 63d extends radially inward from the end on the other side in the axial direction of the second extension unit 63b.

In the first embodiment, the branch oil passage 63 is provided across the outer lid 13, the inner lid 12, and the main body 11, which are the separate member, so that oil passages of the first extension unit 63a, the second extension unit 63b, and the like, which constitute the branch oil passage 63, are easily processed.

As illustrated in FIG. 1, in the first embodiment, the housing 10 includes holes 11d, 11e, 12g. The hole 11d is made in the main body 11. The hole 11d extends upward from the upper end of the supply unit 63d to the outside surface of the housing 10. The hole 11d is closed by a plug member 15d. Consequently, for example, in forming the supply unit 63d, after the through-hole penetrating the housing 10 is formed in the vertical direction Z from the outside surface of the housing 10 to the inside of the accommodation unit 14, the portion of the through-hole corresponding to the hole 11d is closed by the plug member 15d, which allows the formation of the supply unit 63d. Thus, the supply unit 63d can easily be formed by being connected to the fourth extension unit 63f extending in a direction different from the supply unit 63d.

The hole 11e is made in the main body 11. The hole 11e extends upward from the upper end of the supply unit 63c to the outside surface of the housing 10. The hole 11e is closed by a plug member 15e. Consequently, the supply unit 63c can easily be manufactured similarly to the supply unit 63d.

The hole 12g is made in the inner lid 12. The hole 12g extends upward from the upper end of the third extension unit 63e to the outside surface of the housing 10. The hole 12g is closed by a plug member 15g. Consequently, the third extension unit 63e can easily be manufactured similarly to the supply unit 63d.

In the first embodiment, the supply unit 63d, the supply unit 63c, and the third extension unit 63e correspond to a first passage unit extending in a first direction. The fourth extension unit 63f corresponds to a second passage unit extending from an end on one side in the first direction of the first passage unit toward a second direction different from the first direction. In this case, the first direction is the vertical direction Z, and the second direction is the axial direction. One side in the first direction is the upper side.

Figure 4:
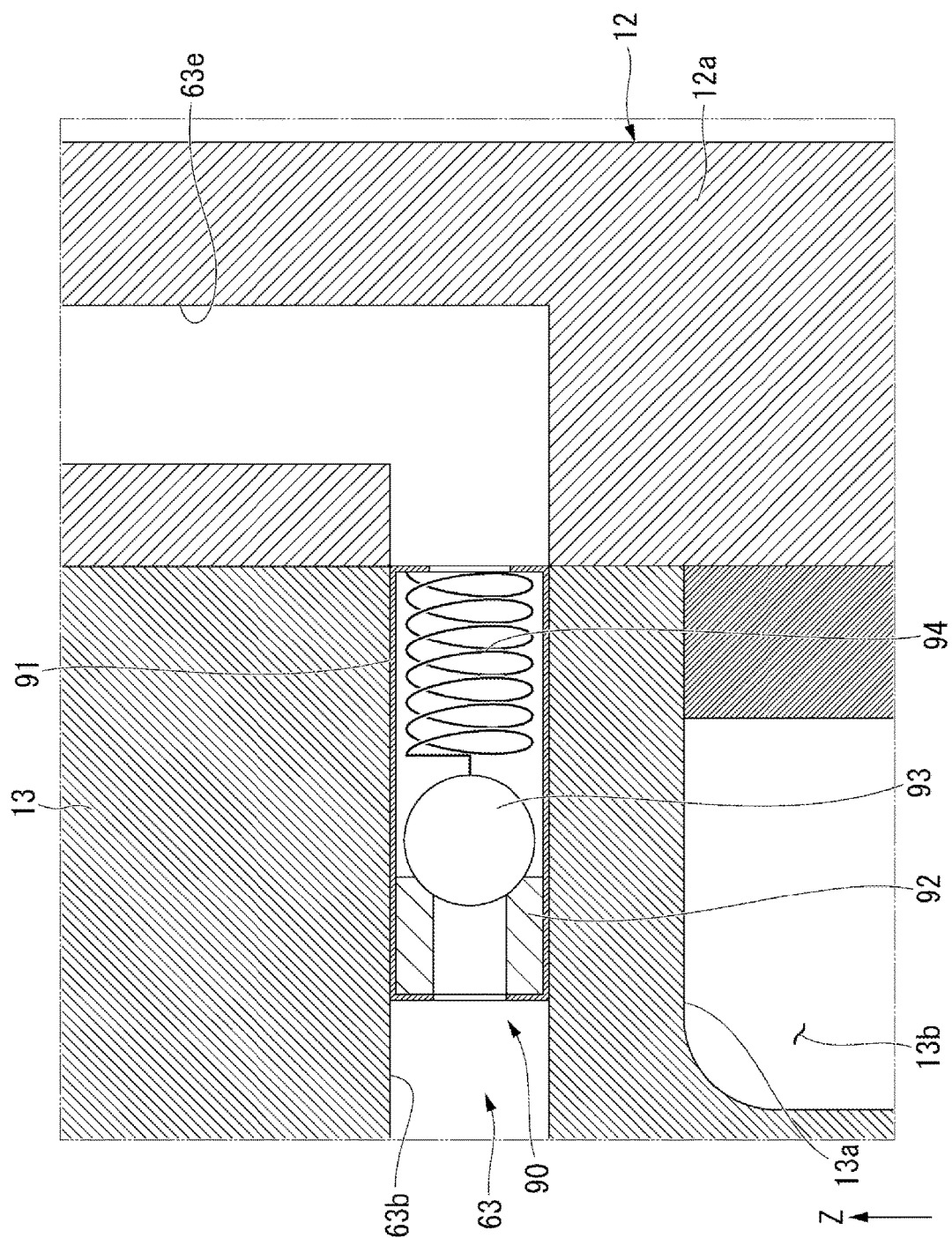
FIG. 4 is a sectional view of a drive apparatus according to a first modification of an example embodiment of the present disclosure.

The valve 90 is provided in the housing 10. The valve 90 is provided in the branch oil passage 63. As illustrated in FIG. 4, in the portion of the branch oil passage 63 provided in one of the inner lid 12 and the outer lid 13, the valve 90 is provided at the end on the side closer to the portion of the branch oil passage 63 provided in the other of the inner lid 12 and the outer lid 13. For this reason, the valve 90 can be disposed in a vicinity of the connection portion between the portion of the branch oil passage 63 provided in the inner lid 12 and the portion of the branch oil passage 63 provided in the outer lid 13. Consequently, before the inner lid 12 and the outer lid 13 are fixed to each other, the valve 90 is easily attached to the portion of the branch oil passage 63 provided in one of the inner lid 12 and the outer lid 13.

Specifically, in the first embodiment, the valve 90 is provided at the end on the side close to the portion of the branch oil passage 63 provided in the inner lid 12 in the portion of the branch oil passage 63 provided in the outer lid 13. That is, the valve 90 is provided at the end on the other side in the axial direction of the portion of the second extension unit 63b provided in the outer lid 13. Consequently, before the inner lid 12 and the outer lid 13 are fixed to each other, the valve 90 is easily inserted into and fixed to the branch oil passage 63 provided in the outer lid 13 from the other side in the axial direction of the outer lid 13. In the first embodiment, the inner lid 12 corresponds to a first portion, and the outer lid 13 corresponds to a second portion.

The valve 90 includes a case 91, a valve seat member 92, a valve body 93, and an elastic member 94. The case 91 has a tubular shape extending in the axial direction, and includes openings on both axial sides. The case 91 is fitted in and fixed to the inside of the branch oil passage 63. The valve seat member 92 is fixed to the end on one side in the axial direction of the inside of the case 91. The valve seat member 92 has a tubular shape that is open to both axial sides. The valve seat member 92 can support the valve body 93 at the end on the other side in the axial direction.

The valve body 93 has a spherical body. The valve body is disposed on the other side in the axial direction with respect to the valve seat member 92 in the inside of the case 91. The valve body 93 is movable in the axial direction. An outer diameter of the valve body 93 is larger than an inner diameter of the valve seat member 92. The valve body 93 can close the opening on the other side in the axial direction of the valve seat member 92 by contacting with the end on the other side in the axial direction of the valve seat member 92. The elastic member 94 is a coil spring extending in the axial direction. The elastic member 94 is disposed in a portion on the other side in the axial direction with respect to the valve body 93 in the inside of the case 91. The end on one side in the axial direction of the elastic member 94 contacts with the valve body 93. The end on the other side in the axial direction of the elastic member 94 is supported by a flange provided at the end on the other side in the axial direction of the case 91. Consequently, the elastic member 94 applies elastic force to the valve body 93 from the other side in the axial direction toward the one side in the axial direction.

The valve body 93 is pressed against the end on the other side in the axial direction of the valve seat member 92 by receiving the elastic force from the elastic member 94, and closes the opening on the other side in the axial direction of the valve seat member 92. Consequently, the valve 90 becomes a closed state in which the oil O flowing in the branch oil passage 63 is blocked. On the other hand, when pressure of the oil O in the branch oil passage 63 on one side in the axial direction of the valve 90 becomes larger than the elastic force of the elastic member 94, the valve body 93 moves to the other side in the axial direction by the pressure of the oil O. This allows the opening on the other side in the axial direction of the valve seat member 92 to be open. Thus, the valve 90 becomes an open state in which the oil O is permitted to flow in the branch oil passage 63. In this way, the valve 90 is switched between the closed state and the open state.

In the branch oil passage 63, the pressure of the oil O in the portion on one side in the axial direction of the valve 90 is increased with increasing pressure of the oil O in the first oil passage 61. That is, in the first embodiment, the valve 90 is switched from the closed state to the open state when the pressure of the oil O in the first oil passage 61 is greater than or equal to a predetermined value. For example, the predetermined value is decided based on pressure resistance performance of the pump 40, a degree of heat generation of the stator 30 with respect to a number of revolutions of the motor shaft 21, and the like.

In the first embodiment, the valve 90 is a check valve. The valve 90 blocks the flow from the side that is open to the accommodation unit 14 in the branch oil passage 63 to the side of the first oil passage 61 irrespective of the state while permitting the flow from the side of the first oil passage 61 in the branch oil passage 63 toward the side that is open to the accommodation unit 14 in the open state.

As illustrated in FIG. 1, the rotor 20 includes a motor shaft 21, a rotor core 22, a magnet 23, a first end plate 24, and a second end plate 25. The motor shaft 21 has the cylindrical shape extending in the axial direction. The motor shaft 21 includes a large diameter unit 21a, a small diameter unit 21b, and an output unit 21e.

The large diameter unit 21a is a portion to which the rotor core 22 is attached. The end on the other side in the axial direction of the large diameter unit 21a is journaled by the bearing 71. The small diameter unit 21b is connected to the large diameter unit 21a on one side in the axial direction of the large diameter unit 21a. The end on one side in the axial direction of the small diameter unit 21b is the end on one side in the axial direction of the motor shaft 21. The end on one side in the axial direction of the small diameter unit 21b is inserted into the space 13b. An outer diameter of the small diameter unit 21b is smaller than an outer diameter of the large diameter unit 21a. The end on the other side in the axial direction of the small diameter unit 21b is journaled by the bearing 70. The motor shaft 21 is journaled by the bearings 70, 71. For example, the bearings 70, 71 are a ball bearing.

The output unit 21e is connected to the large diameter unit 21a on the other side in the axial direction of the large diameter unit 21a. The output unit 21e is the end on the other side in the axial direction of the motor shaft 21. The outer diameter of the output unit 21e is smaller than the outer diameters of the large diameter unit 21a and the small diameter unit 21b. The output unit 21e axially penetrates the bottom unit 11a to protrude to the outside of the housing 10.

The motor shaft 21 includes a flange 21d. The flange 21d protrudes radially outward from an outer circumferential surface of the large diameter unit 21a. The flange 21d has an annular plate shape provided over a whole circumference of the outer circumferential surface of the large diameter unit 21a. The flange 21d is provided in a portion close to the other side in the axial direction of the large diameter unit 21a. A male screw portion is provided on the outer circumferential surface of the portion close to one side in the axial direction of the large diameter unit 21a. A nut 72 is tightened into the male screw portion of the large diameter unit 21a.

The motor shaft 21 includes a second oil passage 62 provided in the motor shaft 21. The second oil passage 62 is a bottomed hole that is recessed from the end on one side in the axial direction of the motor shaft 21 toward the other side in the axial direction. The second oil passage 62 extends from the end on one side in the axial direction of the small diameter unit 21b to the end on the other end in the axial direction of the large diameter unit 21a. In the embodiment, the inner circumferential surface of the second oil passage 62 has the cylindrical shape centered on the center axis J1. The second oil passage 62 is open to one side in the axial direction. The end on one side in the axial direction of the second oil passage 62 is axially opposed to the connection hole 61a. The second oil passage 62 is connected to the first oil passage 61 through the connection hole 61a.

A passage sectional area of the second oil passage 62 is larger than a passage sectional area of the branch oil passage 63. The passage sectional area of the second oil passage 62 is the area of the second oil passage 62 in the section orthogonal to the flow direction of the oil O flowing in the second oil passage 62. In the first embodiment, the passage sectional area of the second oil passage 62 is the area of the section orthogonal to the axial direction in the second oil passage 62. The passage sectional area of the branch oil passage 63 is the area of the branch oil passage 63 in the section orthogonal to the flow direction of the oil O flowing in the branch oil passage 63. The passage sectional area of the branch oil passage 63 includes the passage sectional area of the first extension unit 63a, the passage sectional area of the second extension unit 63b, the passage sectional area of the third extension unit 63e, the passage sectional area of the fourth extension unit 63f, and the passage sectional areas of the supply units 63c, 63d.

The passage sectional area of the first extension unit 63a is the area of the section orthogonal to the vertical direction Z in the first extension unit 63a. The passage sectional area of the second extension unit 63b is the area of the section orthogonal to the axial direction in the second extension unit 63b. The passage sectional area of the third extension unit 63e is the area of the section orthogonal to the vertical direction Z in the third extension unit 63e. The passage sectional area of the fourth extension unit 63f is the area of the section orthogonal to the axial direction in the fourth extension unit 63f. The passage sectional areas of the supply units 63c, 63d are the areas of the sections orthogonal to the vertical direction Z in the supply units 63c, 63d.

The motor shaft 21 includes a first through-hole 26a connecting the second oil passage 62 and the outer circumferential surface of the motor shaft 21. The first through-hole 26a extends in the radial direction. The first through-hole 26a is provided in the large diameter unit 21a. Although not illustrated, a plurality of the first through-holes 26a is provided along, for example, the circumferential direction.

The rotor core 22 has annular shape fitted in the motor shaft 21. The rotor core 22 includes a rotor through-hole 22a axially penetrating the rotor core 22 and a magnet insertion hole 22b axially penetrating the rotor core 22. The rotor through-hole 22a is disposed radially inward with respect to the magnet insertion hole 22b. A plurality of magnet insertion holes 22b is provided along the circumferential direction. The magnet 23 is inserted into the magnet insertion hole 22b.

The first end plate 24 and the second end plate 25 have the annular plate shape expanding in the radial direction. The large diameter unit 21a is inserted into the first end plate 24 and the second end plate 25. The first end plate 24 and the second end plate 25 axially sandwich the rotor core 22 while contacting with the rotor core 22.

As illustrated in FIG. 3, the first end plate 24 is disposed on one side in the axial direction of the rotor core 22. The outer edge in the radial direction of the first end plate 24 is curved toward the other side in the axial direction, and contacts with the outer edge in the radial direction in the surface on one side in the axial direction of the rotor core 22. The outer edge in the radial direction of the first end plate 24 axially overlaps the opening on one side in the axial direction of the magnet insertion hole 22b, and presses the magnet 23 inserted into the magnet insertion hole 22b from one side in the axial direction. A radially inside portion with respect to the outer edge in the radial direction of the first end plate 24 is axially opposed to the surface on one side in the axial direction of the rotor core 22 with a gap 27a interposed therebetween. The radially outside end of the first through-hole 26a is open to the gap 27a.

The first end plate 24 includes an exhaust hole 24a axially penetrating the first end plate 24. That is, the rotor 20 includes the exhaust hole 24a. The exhaust hole 24a is disposed radially inward with respect to the rotor through-hole 22a and radially outward with respect to the nut 72. The exhaust hole 24a is connected to the first through-hole 26a with the gap 27a interposed therebetween. The exhaust hole 24a is open to the inside of the accommodation unit 14. The opening area of the exhaust hole 24a is smaller than the passage sectional area of the branch oil passage 63. The opening area of the exhaust hole 24a is the area of the inside portion of the exhaust hole 24a when viewed along the axial direction.

The second end plate 25 is disposed on the other side in the axial direction of the rotor core 22. The outer edge in the radial direction of the second end plate 25 is curved toward one side in the axial direction, and contacts with the outer edge in the radial direction in the surface on the other side in the axial direction of the rotor core 22. The outer edge in the radial direction of the second end plate 25 axially overlaps the opening on the other side in the axial direction of the magnet insertion hole 22b, and presses the magnet 23 inserted into the magnet insertion hole 22b from the other side in the axial direction. Consequently, both sides in the axial direction of the magnet 23 inserted into the magnet insertion hole 22b are pressed by the first end plate 24 and the second end plate 25. Thus, the magnet 23 can be prevented from coming out of the magnet insertion hole 22b.

A radially inside portion with respect to the outer edge in the radial direction of the second end plate 25 is axially opposed to the surface on the other side in the axial direction of the rotor core 22 with a gap 27b interposed therebetween. The gap 27b is connected to the gap 27a between the first end plate 24 and the rotor core 22 through the rotor through-hole 22a. The second end plate 25 includes an exhaust hole 25a axially penetrating the second end plate 25. The exhaust hole 25a is disposed radially inside the rotor through-hole 22a and radially outside the flange 21d. For example, the radial position of the exhaust hole 25a is, for example, identical to the radial position of the exhaust hole 24a.

The exhaust hole 25a is connected to the first through-hole 26a while the gap 27a, the rotor through-hole 22a, and the gap 27b are interposed therebetween. The exhaust hole 25a is open to the inside of the accommodation unit 14. The opening area of the exhaust hole 25a is smaller than the passage sectional area of the branch oil passage 63. The opening area of the exhaust hole 25a is the area of the inside portion of the exhaust hole 25a when viewed along the axial direction.

The first end plate 24, the rotor core 22, and the second end plate 25 are axially sandwiched between the nut 72 and the flange 21d. The nut 72 is tightened into the male screw portion of the large diameter unit 21a, which allows the nut 72 to press the first end plate 24, the rotor core 22, and the second end plate 25 against the flange 21d. Consequently, the first end plate 24, the rotor core 22, and the second end plate 25 are fixed to the large diameter unit 21a.

The rotation detector 80 in FIG. 1 detects rotation of the rotor 20. In the embodiment, for example, the rotation detector 80 is a Variable Reluctance (VR) type resolver. The rotation detector 80 is disposed in the space 13b. The rotation detector 80 includes a detection target unit 81 and a sensor 82. The detection target unit 81 has an annular shape extending in the circumferential direction. The detection target unit 81 is fitted in and fixed to the small diameter unit 21b. More particularly, the detection target unit 81 is fitted in and fixed to a portion having a smaller outer diameter of a step provided in the small diameter unit 21b. In the step, the outer diameter is decreased from the other side in the axial direction toward one side in the axial direction. The detection target unit 81 is made of a magnetic material.

The sensor 82 is fixed to a surface on one side in the axial direction of the inner lid wall 12a. The sensor 82 has the annular shape surrounding the radial outside of the detection target unit 81. The sensor 82 includes a plurality of coils along the circumferential direction. When the detection target unit 81 rotates together with the motor shaft 21, an induced voltage is generated in the coil of the sensor 82 according to the circumferential position of the detection target unit 81. The sensor 82 detects the rotation of the detection target unit 81 by detecting the induced voltage. Consequently, the rotation detector 80 detects the rotation of the motor shaft 21, and detects the rotation of the rotor 20.

The stator 30 is radially opposed to the rotor 20 with the gap interposed therebetween. The stator 30 includes the stator core 31 and the plurality of coils 32 mounted on the stator core 31. The stator core 31 has the annular shape centered on the center axis J1. The outer circumferential surface of the stator core 31 is fixed to the inner circumferential surface of the main body tube 11b. The stator core 31 is opposed to the radial outside of the rotor core 22 with the gap interposed therebetween.

The pump 40 is disposed at the lower end of the outer lid 13. The pump 40 includes a pump shaft 41, an external gear 42, an internal gear 43, the pump room 46, the suction port 44, and the discharge port 45. The pump shaft 41 is disposed along a pump axis J2 that is different from the center axis J1 in the housing 10. In the embodiment, the pump axis J2 is parallel to the center axis J1. That is, the pump shaft 41 extends in the axial direction of the motor shaft 21. The pump axis J2 is located below the center axis J1.

The pump shaft 41 is disposed below the motor shaft 21 on one side in the axial direction with respect to the stator 30. For this reason, the motor shaft 21 and the pump shaft 41 are disposed at a position where the motor shaft 21 and the pump shaft at least partially overlap each other in the direction orthogonal to the axial direction, which allows the drive device 1 to be easily downsized in the axial direction as compared with the case that the motor shaft 21 and the pump shaft 41 are coaxial to each other. In FIG. 1, the motor shaft 21 and the pump shaft 41 overlap each other in the vertical direction Z. In the first embodiment, as described above, the pump room 46 and the first oil passage 61 are provided in the outer lid 13. Consequently, the pump 40 can collectively be disposed on one side in the axial direction with respect to the stator 30, and the drive device 1 can more easily be downsized in the axial direction. Because the pump shaft 41 extends in the axial direction of the motor shaft 21, the drive device 1 is easily downsized in the radial direction as compared with the case that the pump shaft 41 is inclined with respect to the motor shaft 21.

The pump shaft 41 is disposed inside the accommodation unit 14. The end on one side in the axial direction of the pump shaft 41 is inserted into the pump room 46 through the sliding bearing unit 12e. The portion of the pump shaft 41 inserted into the sliding bearing unit 12e is supported by the sliding bearing unit 12e. Consequently, the pump shaft 41 is journaled about the pump axis J2 by the sliding bearing unit 12e. In this way, in the embodiment, the pump shaft 41 can be supported with a simple configuration.

As described above, in the embodiment, at least a part of the sliding bearing unit 12e is disposed below the liquid level OS of the oil O. For this reason, the oil O flows between the sliding bearing unit 12e and the pump shaft 41. Consequently, the oil O can be used as a lubricating oil for the sliding bearing unit 12e, and the pump shaft 41 can suitably be journaled by the sliding bearing unit 12e.

The external gear 42 is a gear that is rotatable around the pump axis J2. The external gear 42 is fixed to the end on one side in the axial direction of the pump shaft 41, and is accommodated in the pump room 46. As illustrated in FIG.

2, the external gear 42 includes a plurality of teeth 42a on the outer circumferential surface of the external gear 42. A tooth shape of the tooth 42a of the external gear 42 is a trochoidal tooth shape.

The internal gear 43 is an annular gear that is rotatable about a rotation axis J3 eccentric to the pump axis J2. The internal gear 43 is accommodated in the pump room 46. The internal gear 43 surrounds the external gear 42, and meshes with the external gear 42. The internal gear 43 has a plurality of teeth 43a on the inner circumferential surface of the internal gear 43. The tooth shape of the tooth 43a of the internal gear 43 is the trochoidal tooth shape. In this way, the tooth 42a of the external gear 42 and the tooth 43a of the internal gear 43 have the trochoidal tooth shape, so that a trochoid pump can be constructed. Thus, noise generated from the pump 40 can be reduced, and pressure and an amount of oil O discharged from the pump 40 can easily be stabilized.

As described above, the suction port 44 is the portion of the pump room 46 exposed to the inside of the accommodation unit 14 through the opening 12f. In the embodiment, the suction port 44 has a bow shape protruding downward. The suction port 44 is open to a lower region in the accommodation unit 14, and allows the oil O stored in the accommodation unit 14 to be sucked into the pump room 46. In the embodiment, the suction port 44 is disposed below the rotor 20. At least a part of the suction port 44 is disposed below the liquid level OS of the oil O stored in the accommodation unit 14. In FIG. 1, the whole suction port 44 is disposed below the liquid level OS of the oil O. As illustrated in FIG. 1, in the first embodiment, the suction port 44 is open to the lower end in the accommodation unit 14. As described above, the discharge port 45 is the portion that is open to the first oil passage 61 in the pump room 46. The discharge port 45 is open to one side in the axial direction of the pump room 46. The discharge port 45 allows the oil O to be discharged from the pump room 46.

The transmission member 50 has a first gear 51 and a second gear 52. The first gear 51 is a disc-shaped gear that is rotatable about the axis parallel to the axial direction. The first gear 51 is fixed to the end on one side in the axial direction of the large diameter unit 21a. More particularly, the first gear is fitted in and fixed to a portion having a smaller outer diameter of a step 21f provided at the end on one side in the axial direction of the large diameter unit 21a. In the step 21f, the outer diameter is decreased from the other side in the axial direction toward one side in the axial direction. The first gear 51 rotates around the center axis J1 together with the motor shaft 21. The first gear 51 is axially sandwiched between a left step surface of the step of the large diameter unit 21a and the bearing 70.

The second gear 52 is the disc-shaped gear that is rotatable about the axis parallel to the axial direction. The second gear 52 meshes with the first gear 51 on the lower side of the first gear 51. The second gear 52 is fixed to the end on the other side in the axial direction of the pump shaft 41. Both the second gear 52 rotates about the pump axis J2 together with the pump shaft 41. When the first gear 51 rotates in association with the rotation of the motor shaft 21, the second gear 52 meshing with the first gear 51 rotates, and the pump shaft 41 rotates. Consequently, the transmission member 50 transmits the rotation of the motor shaft 21 to the pump shaft 41.

When the rotor 20 rotates to rotate the motor shaft 21, the pump shaft 41 rotates through the transmission member 50, and the external gear 42 rotates. Consequently, the internal gear 43 meshing with the external gear 42 rotates to send the oil O sucked from the suction port 44 into the pump room 46 to the discharge port 45 through between the external gear 42 and the internal gear 43. In this way, the pump 40 is driven through the motor shaft 21. A part of the oil O discharged from the discharge port 45 flows into the second oil passage 62 through the first oil passage 61. As indicated by an arrow in FIG. 3, the oil O flowing into the second oil passage 62 receives radially outside force due to centrifugal force of the rotating motor shaft 21, and flows to the outside of the motor shaft 21 through the first through-hole 26a.

In the embodiment, because the first through-hole 26a is open in the axial gap 27a between the first end plate 24 and the rotor core 22, the oil O flowing out from the first through-hole 26a flows into the gap 27a. A part of the oil O flowing into the gap 27a is exhausted radially outward from the exhaust hole 24a. On the other hand, another part of the oil O flowing into the gap 27a flows into the gap 27b through the rotor through-hole 22a. The oil O flowing into the gap 27b is exhausted radially outward from the exhaust hole 25a. The oil O exhausted radially outward from the exhaust holes 24a, 25a is blown onto the coil 32. This enables the oil O to cool the coil 32. The second oil passage 62 is provided in the motor shaft 21, so that the rotor 20 can also be cooled by the oil O until the oil O is exhausted from the exhaust holes 24a, 25a. In particular, the magnet 23 can be cooled, so that demagnetization of the magnet 23 can be prevented.

FIG. 3 illustrates an example in which the oil O is exhausted upward from the exhaust holes 24a, 25a. However, the present disclosure is not limited to this configuration. Because the rotor 20 rotates, a circumferential positions of the exhaust holes 24a, 25a change in association with the rotation of the rotor 20. Consequently, the direction of the oil O exhausted from the exhaust holes 24a, 25a changes in the circumferential direction, and the plurality of coils 32 arranged along the circumferential direction can be cooled by the oil O.

As described above, the pump 40 can be driven by the rotation of the motor shaft 21, and the oil O stored in the housing 10 can be sucked up by the pump 40, and supplied to the rotor 20 and the stator 30. This allows the rotor 20 and the stator 30 to be cooled using the oil O stored in the housing 10. The oil O supplied to the stator 30 drops in the accommodation unit 14, and is stored in the lower region of the accommodation unit 14 again. This allows circulation of the oil O in the accommodation unit 14.

Another part of the oil O discharged from the discharge port 45 can flow into the branch oil passage 63 through the first oil passage 61. Because the valve 90 is provided in the branch oil passage 63, whether the oil O flows into the branch oil passage 63 is changed depending on the open or closed state of the valve 90. When the valve 90 is in the closed state, the flow of the oil O in the branch oil passage 63 is blocked, so that another part of the oil O discharged from the discharge port 45 does not flow into the branch oil passage 63. Consequently, almost all of the oil O discharged from the discharge port 45 flows from the first oil passage 61 into the second oil passage 62.

On the other hand, when the valve 90 is in the open state, the flow of the oil O in the branch oil passage 63 is permitted, so that another part of the oil O discharged from the discharge port 45 flows into the branch oil passage 63. Consequently, the oil O discharged from the discharge port 45 flows from the first oil passage 61 while being branched into the second oil passage 62 and the branch oil passage 63. The oil O flowing in the branch oil passage 63 flows out from the supply units 63c, 63d, and is supplied to the coil 32. This enables the oil O to further cool the coil 32. In the first embodiment, because the branch oil passage 63 is open to the inside of the accommodation unit 14 on the upper side of the stator 30, the oil O flowing out from the branch oil passage 63 is supplied from the upper side to the stator 30. Consequently, the oil O can be supplied from the upper side to the lower side of the stator 30, and the stator 30 is easily cooled.

As described above, in the first embodiment, the inflow of the oil O into the branch oil passage 63 can be controlled by switching between the open and closed states of the valve 90.

At this point, the flow rate of the oil O sent by the pump 40 is relatively increased when the motor shaft 21 rotates at a relatively high speed. However, when the flow rate of the oil O increases excessively, the pressure of the oil O in the pump room 46 of the pump 40 increases excessively, and sometimes the pump 40 is damaged.

On the other hand, for example, the valve 90 is closed when the motor shaft 21 rotates at a relatively low speed, and the valve 90 is opened when the motor shaft 21 rotates at a relatively high speed. Consequently, when the flow rate of the oil O sent by the pump 40 is relatively increased, a part of the oil O sent by the pump 40 can be escaped to the branch oil passage 63. Thus, the pressure of the oil O in the pump room 46 of the pump 40 can be prevented from increasing excessively, and the pump 40 can be prevented from being damaged.

Because the branch oil passage 63 is open to the inside of the accommodation unit 14 on the upper side of the stator 30, the oil O escaped to the branch oil passage 63 can be supplied from the upper side to the stator 30. This allows an amount of oil O supplied to the stator 30 to be increased during the high-speed rotation. Thus, in the case that a heat generation amount of stator 30 is relatively increased while the motor shaft 21 rotates at a relatively high speed, the amount of oil O supplied to the stator 30 can be increased, and the insufficient cooling of the stator 30 can be prevented.

On the other hand, because the flow rate of the oil O sent by the pump 40 is relatively decreased during the rotation of the motor shaft 21 at a relatively low speed, sometimes the amount of oil O supplied to the second oil passage 62 is lacked when the oil O is supplied to both the second oil passage 62 and the branch oil passage 63. Because the oil O sent to the second oil passage 62 is radially exhausted from the exhaust holes 24a, 25a through the first through-hole 26a made in the rotating motor shaft 21, the oil O is easily supplied to the whole stator 30, and the stator 30 is easily cooled as compared with the case that the oil O is supplied from the branch oil passage 63. For this reason, when the amount of oil O supplied to the second oil passage 62 is lacked, sometimes the stator 30 is insufficiently cooled.

On the other hand, in the first embodiment, almost all of the oil O sent by the pump 40 can be supplied to the second oil passage 62 by setting the valve 90 to the closed state in the case that the flow rate of the oil O sent by the pump 40 is relatively decreased. Thus, the oil O supplied to the second oil passage 62 can be prevented from being lacked, and the insufficient cooling of the stator 30 can be prevented.

In the first embodiment, the valve 90 is switched from the closed state to the open state when the pressure of the oil O in the first oil passage 61 is greater than or equal to a predetermined value. For this reason, when the rotation of the motor shaft 21 is relatively increased to relatively increase the pressure of the oil O discharged from the pump 40, the branch oil passage 63 can be open to flow the oil O into the branch oil passage 63. This allows the valve 90 to be automatically switched according to the number of revolutions of the motor shaft 21. In the first embodiment, the valve 90 is automatically opened and closed by a balance between the elastic force of the elastic member 94 and the pressure of the oil O in the first oil passage 61. For this reason, conveniently there is no need to provide a controller or the like that controls switching of the valve 90. In the first embodiment, the pressure of the oil O in the first oil passage 61, namely, the predetermined value in switching the valve 90 can be adjusted by adjusting the elastic force of the elastic member 94.

In the first embodiment, the first portion is the inner lid 12, and the second portion is the outer lid 13. For example, the portion of the branch oil passage 63, in which the valve 90 is provided, is easily located closer to the first oil passage 61 as compared with the case that the first portion is the main body 11 while the second portion is the inner lid 12. Consequently, the pressure change of the oil O in the first oil passage 61 is quickly and easily transmitted to the valve 90, and responsiveness of the valve 90 can be improved. Thus, when the rotation of the motor shaft 21 becomes the high speed, the state of the valve 90 can suitably be switched. For this reason, the damage to the pump 40 can further be prevented.

In the first embodiment, the passage sectional area of the second oil passage 62 is greater than the passage sectional area of the branch oil passage 63. For this reason, the passage sectional area of the second oil passage 62 is relatively and easily enlarged. As described above, as compared with the oil O supplied from the branch oil passage 63 to the stator 30, the oil O supplied from the second oil passage 62 to the stator 30 is more easily supplied to the whole stator 30, and the stator 30 is easily cooled. For this reason, the passage sectional area of the second oil passage 62 is enlarged, so that the oil O is efficiently supplied to the stator 30 to suitably and easily cool the stator 30.

In the first embodiment, the opening areas of the exhaust holes 24a, 25a are smaller than the passage sectional area of the branch oil passage 63. For this reason, the opening areas of the exhaust holes 24a, 25a are relatively and easily reduced. Consequently, even if the flow rate of the oil O discharged from the pump 40 is relatively decreased, the oil O can properly be exhausted from the exhaust holes 24a, 25a. Thus, the oil O is easily sprayed to the stator 30, and the stator 30 is easily cooled. For example, even if a load on the stator 30 increases during the rotation of the motor shaft 21 at a relatively low speed, the stator 30 can suitably be cooled. For example, the case that the load on the stator 30 increases during the rotation of the motor shaft 21 at the relatively low speed is the case that the vehicle moves up a slope when the drive device 1 is a drive device that rotates the wheels of the vehicle.

In the first embodiment, the suction port 44 through which the oil O is sucked into the pump room 46 is open to the lower region in the accommodation unit 14 in which the oil O is stored. This enables the suction port 44 to be directly exposed to the oil O stored in the accommodation unit 14. This eliminates need for the oil passage that leads the oil stored in the accommodation unit 14 into the pump room 46. Thus, complication of the oil passage through which the oil O is sent by the pump 40 can be prevented to easily simplify the structure of the drive device 1 including the pump 40. Consequently, in the embodiment, the drive device 1 can be downsized.

In the embodiment, the suction port 44 is disposed below the rotor 20, so that the suction port 44 is easily disposed below the liquid level OS of the oil O. Consequently, the oil O is easily sucked from the suction port 44 into the pump room 46. Even if the liquid level OS is disposed below the rotor 20, the suction port 44 can be disposed below the liquid level OS. This enables the oil O to be easily sucked from the suction port 44 while the liquid level OS is located below the rotor 20 and the oil O is prevented from becoming the rotational resistance of the rotor 20.

In the embodiment, at least a part of the suction port 44 is disposed below the liquid level OS of the oil O, so that the suction port 44 is more easily exposed to the oil O stored in the accommodation unit 14. This allows the oil O to be more easily sucked from the suction port 44 into the pump room 46.

In the first embodiment, because the closing unit 12d that closes a part of the opening on the other side in the axial direction of the pump room 46 can constitute a part of the inner lid 12, It is possible to close a part of the opening on the other side in the axial direction of the pump room 46 by mounting the outer lid 13 on the inner lid 12. Consequently, there is no need to separately provide a member that closes the pump room 46, and the number of components of the drive device 1 can easily be decreased. The suction port 44 of the pump room 46 can easily be exposed to the inside of the accommodation unit 14 by providing the opening 12f in the inner lid 12.

The present disclosure is not limited to the above embodiment, but other configurations may be adopted. The closing unit 12d may be provided in the outer lid 13. The pump room 46 may be provided in the inner lid 12. In this case, the pump room 46 is recessed from surface on one side in the axial direction of the inner lid 12 toward the other side in the axial direction. The inner lid 12 and the outer lid 13 may be a single member.

The rotor core 22 may be fixed to the outer circumferential surface of the motor shaft 21 by press fitting or the like. In this case, the first end plate 24 and the second end plate 25 may not be provided. In this case, the oil O flowing out from the first through-hole 26a may directly be supplied to the coil 32, or a hole connected to the first through-hole 26a may be provided in the rotor core 22 to supply the oil O to the coil 32 through the hole of the rotor core 22. The oil O may be supplied to the stator core 31.

The pump shaft 41 may be inclined with respect to the motor shaft 21. The sliding bearing unit 12e may be located above the liquid level OS. The pump shaft 41 may be journaled by a ball bearing. The tooth 42a of the external gear 42 and the tooth 43a of the internal gear 43 may have a cycloid tooth shape or an involute tooth shape.

Figure 5:
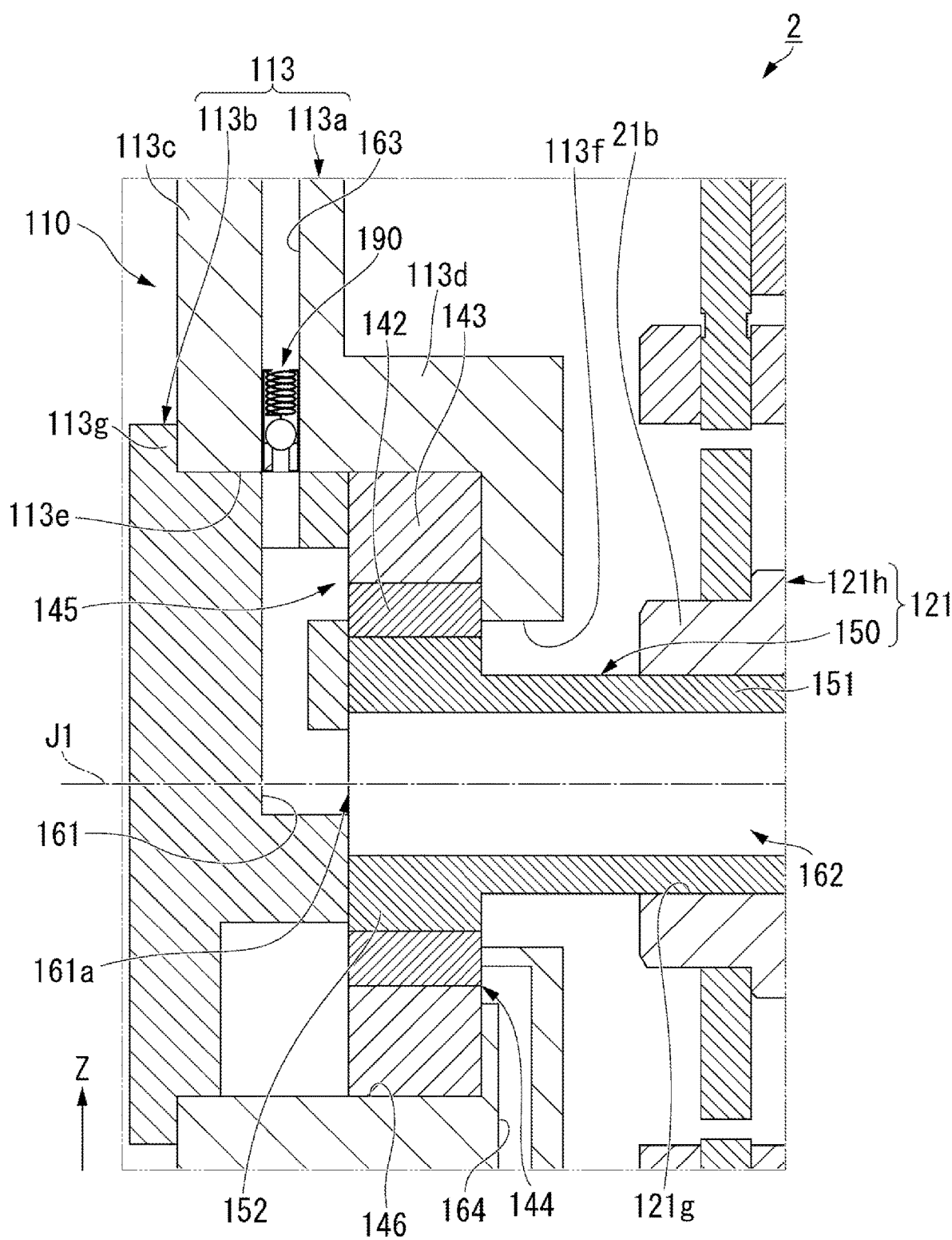
FIG. 5 is a side view of a vehicle on which the drive apparatus according to the first modification is installed.

As illustrated in FIG. 5, in a drive device 2 according to a second embodiment, an outer lid 113 includes an outer lid body 113a and a plug body 113b. The outer lid body 113a expands in the radial direction. The outer lid body 113a includes an outer lid wall 113c and a protrusion 113d. The outer lid wall 113c expands in the radial direction. Although not illustrated, the radially outer edge of the outer lid wall 113c is fixed to the radially outer edge of the inner lid 12. The protrusion 113d protrudes from the central portion of the outer lid wall 113c toward the other side in the axial direction.

The outer lid body 113a includes a second recess 113e and a second through-hole 113f. The second recess 113e is recessed from the surface on one side in the axial direction of the outer lid body 113a toward the other side in the axial direction. The second recess 113e is provided in the central portion of the outer lid body 113a, and is provided across the outer lid wall 113c and the protrusion 113d. The second through-hole 113f penetrates from the bottom surface of the second recess 113e to the surface on the other side in the axial direction of the protrusion 113d. That is, the second through-hole 113f penetrates from the bottom surface of the second recess 113e to the inside of a housing 110. The center axis J1 passes through the second through-hole 113f.

The plug body 113b is fitted in the second recess 113e, and fixed to the outer lid body 113a. The plug body 113b closes the opening on one side in the axial direction of the second recess 113e. The plug body 113b covers one side in the axial direction of a motor shaft 121. The plug body 113b includes a collar 113g protruding radially outward at the end on one side in the axial direction. The collar 113g contacts with the surface on one side in the axial direction of the outer lid wall 113c. Consequently, the plug body 113b can be positioned in the axial direction.

A pump room 146 is provided in the outer lid 113. The pump room 146 is axially provided between the surface on the other side in the axial direction of the plug body 113b and the bottom surface of the second recess 113e. In the second embodiment, the surface on the other side in the axial direction of the pump room 146 is the bottom surface of the second recess 113e. The surface on one side in the axial direction of the pump room 146 is the surface on the other side in the axial direction of the plug body 113b. The pump room 146 is the end on the other side in the axial direction in the second recess 113e. The center axis J1 passes through the pump room 146. The pump room 146 accommodates an internal gear 143 and an external gear 142.

The housing 110 includes a first oil passage 161 and a suction oil passage 164. The first oil passage 161 is provided in the outer lid 113. More particularly, the first oil passage 161 is provided in the plug body 113b. For this reason, the configuration of the first oil passage 161 can easily be changed by exchanging the plug body 113b. The first oil passage 161 is disposed on one side in the axial direction of the pump room 146. The first oil passage 161 connects an upper end of the pump room 146 and the central portion of the pump room 146 on one side in the axial direction of the pump room 146. A portion of the first oil passage 161 connected to the pump room 146 is open to the surface on the other side in the axial direction of the plug body 113b.

The upper end connected to the first oil passage 161 in the pump room 146 is a discharge port 145. The central portion connected to the first oil passage 161 in the pump room 146 is a connection port 161a. The center axis J1 passes through the connection port 161a.

Although not illustrated, the suction oil passage 164 extends upward from the opening 12f. The upper end of the suction oil passage 164 is connected to the pump room 146 on the other side in the axial direction of the pump room 146. The portion the pump room 146 connected to the suction oil passage 164 is a suction port 144. The suction port 144 is disposed below the center axis J1.

In the second embodiment, a branch oil passage 163 extends upward from the first oil passage 161. The branch oil passage 163 is provided across the plug body 113b and the outer lid body 113a. In the second embodiment, the plug body 113b corresponds to the first portion, and the outer lid body 113a corresponds to the second portion.

In the second embodiment, a valve 190 is provided at the end on the side close to the portion of the branch oil passage 163 provided in the plug body 113b in the portion of the branch oil passage 163 provided in the outer lid body 113a. That is, the valve 190 is provided at the lower end of the portion of the branch oil passage 163 provided in the outer lid body 113a.

In the second embodiment, the motor shaft 121 includes a motor shaft body 121h and a mounting member 150. For example, the motor shaft body 121h has the same shape as the motor shaft 21 of the first embodiment.

The mounting member 150 is fixed to one side in the axial direction of the motor shaft body 121h. The mounting member 150 is fitted in and fixed to a bottomed hole 121g that is recessed and extends from the end on one side in the axial direction of the motor shaft body 121h toward the other side in the axial direction. The mounting member 150 has the tubular shape that is open to both axial sides. In the second embodiment, the mounting member 150 has the cylindrical shape centered on the center axis J1. The mounting member 150 extends to one side in the axial direction with respect to the motor shaft body 121h, and is inserted into the second through-hole 113f.

The mounting member 150 includes a fitting unit 151 and a fixing unit 152. The fitting unit 151 is the portion fitted in the hole 121g. The fitting unit 151 is fixed to the inner circumferential surface at the end on one side in the axial direction of the hole 121g, and extends from the inside of the hole 121g toward one side in the axial direction with respect to the motor shaft body 121h. The end of one side in the axial direction of the fitting unit 151 is inserted into the second through-hole 113f. That is, at least a part of the fitting unit 151 is inserted into the second through-hole 113f. For this reason, the radial gap between the outer circumferential surface of the mounting member 150 and the inner circumferential surface of the second through-hole 113f can be increased. This enables the mounting member 150 to be prevented from contacting with the inner circumferential surface of the second through-hole 113f even if the position of the mounting member 150 is radially displaced due to vibration or the like.

The fixing unit 152 is located on one side in the axial direction of the fitting unit 151. The fixing unit 152 is connected to the end on one side in the axial direction of the fitting unit 151. The outer diameter of the fixing unit 152 is larger than the outer diameter of the fitting unit 151, and is smaller than the inner diameter of the second through-hole 113f. The fixing unit 152 is inserted into the pump room 146. For example, the inner diameter of the fitting unit 151 and the inner diameter of the fixing unit 152 are identical to each other.

The external gear 142 is fixed to the mounting member 150. In the second embodiment, the external gear 142 is fixed to the radially outside surface of the fixing unit 152. More particularly, the fixing unit 152 is fitted in and fixed to a fixing hole axially penetrating the external gear 142. As described above, in the second embodiment, the fitting unit 151 having the outer diameter smaller than that of the fixing unit 152 is fitted in the hole 121g, and the external gear 142 is fixed to the fixing unit 152 having the outside diameter larger than that of the fitting unit 151. For this reason, even if the inner diameter of the hole 121g is different from the inner diameter of the fixing hole of the external gear 142, the motor shaft body 121h and the external gear 142 can be coupled to each other with the mounting member 150 interposed therebetween.

In the second embodiment, the second oil passage 162 extends from the end on one side in the axial direction of the mounting member 150 toward the other side in the axial direction, and is provided across the mounting member 150 and the motor shaft body 121h. The second oil passage 162 is configured such that the inside of the mounting member 150 and the portion of the hole 121g located on the other side in the axial direction with respect to the mounting member 150 are axially connected to each other. That is, the radially inside surface of the mounting member 150 constitutes a part of the radially inside surface of the second oil passage 162.

In each of the above embodiments, the valve may be provided at any position of the branch oil passage as long as the valve is provided in the branch oil passage. In the first embodiment, the valve 90 may be provided in the portion of the branch oil passage 63 provided in the inner lid 12 as the first portion. In the second embodiment, the valve 190 may be provided in the portion of the branch oil passage 163 provided in the plug body 113b as the first portion. The valve may be provided in an intermediate portion of the branch oil passage provided in one of the first and second portions that are the different member. The first portion and the second portion are not particularly limited as long as the branch oil passage is provided across the first portion and the second portion, which are the different member. For example, the first portion may be the main body and the second portion may be the inner lid.

The valve is not particularly limited as long as the valve is switched between the closed state in which the flow of oil O in the branch oil passage is blocked and the open state in which the flow of the oil O in the branch oil passage is permitted. For example, the valve may be a solenoid valve. In this case, a controller that opens and closes the valve based on the number of revolutions of the motor shaft or the pressure of the oil O in the first oil passage may be provided. The valve need not be a check valve.

The branch oil passage may be provided only in a single member. The passage sectional area of the second oil passage may be smaller than the passage sectional area of the branch oil passage. The opening area of the exhaust hole may be larger than the passage sectional area of the branch oil passage.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A drive device comprising:
a rotor including a motor shaft disposed along a center axis extending in one direction;
a stator radially opposed to the rotor with a gap interposed between the stator and the rotor;
a housing including an accommodation portion to store oil and accommodate the rotor and the stator;
a pump driven through a motor shaft; and
a valve provided in the housing; wherein the pump includes:
a pump room in the housing;
a suction port through which the oil is to be sucked into the pump room; and
a discharge port through which the oil is to be discharged from the pump room;
the housing includes:
a first oil passage connected to the discharge port; and
a branch oil passage that is connected to the first oil passage and is open to an inside of the accommodation portion on an upper side in a vertical direction of the stator;

the motor shaft includes:
- a second oil passage that is provided in the motor shaft and connected to the first oil passage; and
- a first through-hole connecting the second oil passage and an outer circumferential surface of the motor shaft; and the valve is provided in the branch oil passage and switched between a closed state in which a flow of the oil in the branch oil passage is blocked and an open state in which the flow of the oil in the branch oil passage is permitted.

2. The drive device according to claim 1, wherein the valve is switched from the closed state to the open state when pressure of the oil in the first oil passage is greater than or equal to a predetermined value.

3. The drive device according to claim 1, wherein the housing includes:
- a first portion; and
- a second portion that is separate from the first portion and is attached to the first portion;
  - the branch oil passage extends across the first portion and the second portion; and
- the valve is provided at an end on a side of a portion of the branch oil passage provided in one of the first portion and the second portion at or adjacent to a side of the portion of the branch oil passage provided in the other of the first portion and the second portion.

4. The drive device according to claim 3, wherein
- the first portion holds a bearing journaling the motor shaft and covers one side in an axial direction of the stator; and
- the second portion is attached to one side in the axial direction of the first portion and covers one side in the axial direction of the motor shaft.

5. The drive device according to claim 1, wherein a passage sectional area of the second oil passage is greater than a passage sectional area of the branch oil passage.

6. The drive device according to claim 1, wherein
- the rotor includes an exhaust hole connected to the first through-hole;
- the exhaust hole is open to the inside of the accommodation portion; and
- an opening area of the exhaust hole is smaller than the passage sectional area of the branch oil passage.

7. The drive device according to claim 1, wherein the branch oil passage includes:
- a first passage portion extending in a first direction; and
- a second passage portion extending from an end on one side in the first direction of the first passage portion toward a second direction different from the first direction;
  - the housing includes a hole extending from the end on one side in the first direction of the first passage portion to an outside surface of the housing on one side in the first direction; and
- the hole is closed by a plug.

* * * * *